United States Patent
Al-Nuaimi et al.

(10) Patent No.: US 12,012,102 B2
(45) Date of Patent: Jun. 18, 2024

(54) METHOD FOR DETERMINING A LANE CHANGE INDICATION OF A VEHICLE

(71) Applicant: Bayerische Motoren Werke Aktiengesellschaft, Munich (DE)

(72) Inventors: Anas Al-Nuaimi, Germering (DE); Valeriy Khakhutskyy, Munich (DE); Philipp Martinek, Petershausen (DE); Tobias Rehder, Munich (DE); Udhayaraj Sivalingam, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 586 days.

(21) Appl. No.: 17/049,115

(22) PCT Filed: Jul. 16, 2019

(86) PCT No.: PCT/EP2019/069059
§ 371 (c)(1),
(2) Date: Oct. 20, 2020

(87) PCT Pub. No.: WO2020/048669
PCT Pub. Date: Mar. 12, 2020

(65) Prior Publication Data
US 2021/0237737 A1 Aug. 5, 2021

(30) Foreign Application Priority Data
Sep. 5, 2018 (DE) ............ 10 2018 215 055.9

(51) Int. Cl.
*B60W 30/18* (2012.01)
*G06N 3/045* (2023.01)
(Continued)

(52) U.S. Cl.
CPC . *B60W 30/18163* (2013.01); *B60W 2420/403* (2013.01); *B60W 2552/10* (2020.02);
(Continued)

(58) Field of Classification Search
CPC ....... B60W 30/18163; B60W 2420/42; B60W 2552/10; B60W 2552/40; B60W 2552/53;
(Continued)

(56) References Cited

U.S. PATENT DOCUMENTS

| 2007/0115105 A1 | 5/2007 | Schmitz |
| 2013/0085976 A1 | 4/2013 | Bone et al. |

(Continued)

FOREIGN PATENT DOCUMENTS

| CN | 105975915 A | 9/2016 |
| CN | 106647776 A | 5/2017 |

(Continued)

OTHER PUBLICATIONS

English translation of Chinese-language Office Action issued in Chinese Application No. 201980025470.4 dated Jan. 5, 2022 (10 pages).

(Continued)

*Primary Examiner* — Ian Jen
*Assistant Examiner* — Hossam M Abd El Latif
(74) *Attorney, Agent, or Firm* — Crowell & Moring LLP (57) ABSTRACT

A method for determining a lane change indication of a vehicle, preferably a passenger car, includes the following steps: loading a lane change model and position data of the vehicle, the position data indicating a distance of the vehicle from a lane center of a lane; and determining a lane change indication using the position data and the lane change model.

17 Claims, 4 Drawing Sheets

(51) Int. Cl.
*G06N 3/08* (2023.01)
*G06V 10/82* (2022.01)
*G06V 20/56* (2022.01)
*G06V 20/58* (2022.01)
*G08G 1/16* (2006.01)

(52) U.S. Cl.
CPC ..... *B60W 2552/40* (2020.02); *B60W 2552/53* (2020.02); *B60W 2555/60* (2020.02)

(58) Field of Classification Search
CPC ... B60W 2555/60; G08G 1/167; G06N 3/045; G06N 3/08; G06V 2201/08; G06V 10/82; G06V 20/58; G06V 20/588
USPC .......................................................... 701/26
See application file for complete search history.

(56) References Cited

U.S. PATENT DOCUMENTS

| | | | |
|---|---|---|---|
| 2014/0303828 A1 | 10/2014 | Joshi | |
| 2015/0274206 A1* | 10/2015 | Takeda | B62D 6/008 701/41 |
| 2015/0310285 A1* | 10/2015 | Ogata | B60R 1/00 382/104 |
| 2016/0185388 A1* | 6/2016 | Sim | G06V 20/58 701/41 |
| 2017/0206426 A1* | 7/2017 | Schrier | G05D 1/0088 |
| 2017/0267177 A1 | 9/2017 | Nariyambut Murali et al. | |
| 2018/0086338 A1* | 3/2018 | Yamada | B60W 10/04 |
| 2018/0122244 A1* | 5/2018 | Mueller | G06V 20/58 |
| 2018/0201270 A1* | 7/2018 | Kang | B60W 30/143 |
| 2018/0215389 A1* | 8/2018 | Takae | B60R 21/00 |
| 2019/0100211 A1* | 4/2019 | Liu | B60W 10/20 |
| 2022/0405952 A1* | 12/2022 | Niesen | G06T 7/70 |

FOREIGN PATENT DOCUMENTS

| | | | |
|---|---|---|---|
| DE | 10 2014 104 663 A1 | 10/2014 | |
| DE | 10 2017 105 661 A1 | 9/2017 | |
| DE | 10 2016 120 876 A1 | 5/2018 | |
| EP | 1 663 695 B1 | 3/2009 | |
| GB | 2512317 A * | 10/2014 | ........ B60W 30/0956 |
| GB | 2512317 A | 10/2014 | |
| WO | WO 2014/154771 A1 | 10/2014 | |

OTHER PUBLICATIONS

International Search Report (PCT/ISA/210) issued in PCT Application No. PCT/EP2019/069059 dated Oct. 24, 2019 with English translation (five pages).

German-language Written Opinion (PCT/ISA/237) issued in PCT Application No. PCT/EP2019/069059 dated Oct. 24, 2019 (seven pages).

German-language Search Report issued in German Application No. 10 2018 215 055.9 dated May 22, 2019 with partial English translation (12 pages).

English Translation of Chinese-language Office Action issued in Chinese Application No. 201980025470.4 dated Sep. 13, 2022 (eight (8) pages).

* cited by examiner

METHOD FOR DETERMINING A LANE CHANGE INDICATION OF A VEHICLE

BACKGROUND AND SUMMARY OF THE INVENTION

The invention relates to a method for determining a lane change indication of a vehicle, to a computer-readable storage medium and to a vehicle.

In the context of autonomous driving, it is necessary to precisely determine and/or to predict the action of one's own vehicle and of other traffic participants. In order to perceive their surroundings, autonomous vehicles are equipped with a multiplicity of different sensors, such as for example lidar, ultrasound sensors, radar or cameras. By fusing said sensors, it is possible to create what is known as a surroundings model that records the recognized objects (people, automobiles, roads, signposts, etc.) and their location with respect to one's own vehicle. The data from a radar system may thus for example be combined with those from a visual camera system in order to more reliably recognize traffic participants in different weather conditions. At the same time, visual lane recognition may be used to record the road profile. The surroundings model may furthermore comprise information with regard to road information or even the weather.

The surroundings model is continuously updated with the most up-to-date sensor detections. This makes it possible to be able to at least partly derive the behavior of the traffic participants from the temporal change in the positions of said traffic participants.

Due to the multiplicity of installed sensors and the complexity of the vehicle surroundings, it is becoming increasingly difficult to determine the behavior using rule-based approaches. Artificial intelligence (AI) and machine learning (ML) methods are instead increasingly being used.

The AI algorithms that are used, in particular neural networks, are mathematical models whose parameters have to be learned. Neural networks in this case belong to supervised learning methods. This means that, in order to learn the parameters, not only do all the relevant data from the surroundings model have to be predefined, but these data furthermore also have to be enriched with information about the present behavior (the basic truth) of other traffic participants, which data are not able to be drawn directly from the surroundings model. A data record may thus for example comprise camera images that represent a vehicle traveling in front for six seconds. A training data record may furthermore however also store an action associated with the camera images. By way of example, the training record may indicate that a vehicle traveling in front performs a lane change during the six seconds that are shown.

A very large number of training data records are generally necessary in order to train an artificial intelligence algorithm. Generating these training data records is highly complex. One common procedure is to enrich the training data manually with the basic truth, that is to say the data are annotated ("labeled") manually by experts. This process is lengthy and expensive on account of the high amount of data.

A further option for generating labeled training data is that of annotating data fully automatically. In this case, it is possible to define fixed rules, and an action is deemed to be performed when said rules are met. By way of example, in the case of a lane change of a vehicle, it may be fixedly defined that a lane change is deemed to have taken place when the distance between a vehicle reference point and a lane center adopts a particular value.

The position of the vehicle with respect to its lane center may be derived from the surroundings model from the position of the vehicle and the position of the recognized lane. One problem with the latter methods is that sensor inaccuracies may lead to an oscillation in the lane association. An individual lane change of a vehicle, due to sensor inaccuracies, may thus lead to the system recognizing a plurality of, for example three, lane changes instead of one lane change. Such results are not satisfactory since the machine learning algorithms do not deliver any satisfactory results using faulty training data.

One object of the present invention is therefore to provide a method for determining a lane change that addresses the abovementioned disadvantages. Another object of the invention is to provide a method that makes it possible to automatically annotate training data. A further aim is to provide a method that proceeds as far as possible without human interaction. A further object of the invention is to provide a corresponding computer-readable storage medium and a vehicle.

This object is achieved by a method, by a computer-readable storage medium, and by a vehicle, according to the independent claims.

The object is in particular achieved by a method for determining a lane change indication of a vehicle, preferably of an automobile, having the following steps:
loading a lane change model and position data of the vehicle, wherein the position data indicate a distance between the vehicle and a lane center of a lane;
determining a lane change indication, wherein the determination is performed using the position data and the lane change model.

One core concept of the invention is that the determination of the lane change indication is performed using position data and a lane change model. Due to the fact that a plurality of information sources are used, the accuracy of the lane change indication is able to be increased. The described method furthermore allows performance on a server and on a vehicle itself. The position data may relate to one's own vehicle or to a vehicle located in the surroundings.

The lane center may be determined using visual methods, for example by determining two outer roadway markings, such that the middle is able to be determined. It is furthermore possible for the lane center to be indicated explicitly in the position data. The distance may be indicated in centimeters, millimeters or meters.

A vehicle reference point may be defined for the vehicle in order to determine the distance between the vehicle and a lane center. By way of example, the geometric midpoint of the vehicle may be used as vehicle reference point. It is furthermore possible to couple the vehicle reference point to the arrangement of a sensor in the vehicle, such that the coordinate system spanned by the sensor is also used to determine the distance. In one embodiment, the position data may comprise at least two data points, wherein each data point may indicate the distance between a vehicle reference point of the vehicle and a lane center of a roadway at a particular time.

It is advantageous for a temporal evolution of the distances between the vehicle reference point and the lane center to be represented in the position data. This makes it possible to prevent a one-off or brief change of lane already being recognized as a permanent lane change. Oscillation of the lane assignment is thus effectively prevented.

In one embodiment, the determination may comprise detecting a point of discontinuity, in particular a change of sign, in the position data.

A particularly simple implementation results when only a change of sign needs to be detected in the distances. Since the position data may indicate a distance from a lane center, the sign changes upon a lane change, since the reference lane changes and the position with respect to the lane center is a distance provided with a sign. The change of sign therefore takes place precisely when the vehicle changes to another lane across a roadway marking. In addition to the change of sign, there is also a jump in the distance value, which appears as a point of discontinuity. This is due to the fact that the distance value jumps abruptly from a high positive value to a high negative value (or from a high negative value to a high positive value).

In one embodiment, the lane change model may be designed as a convolutional neural network (CNN).

A CNN is particularly well-suited to analyzing or to classifying time-variable data. This thus gives a particularly efficient and highly accurate implementation. It is furthermore possible, in addition to detecting a point of discontinuity or a change of sign, for a complex pattern that indicates a lane change to be recognized. The susceptibility of the lane assignment to oscillation is thus further reduced. The accuracy of the classification is furthermore increased. CNNs are also able to be stored in a compact manner, such that little memory space is used.

In one embodiment, the method may comprise calculating a two-dimensional projection using a surroundings model, wherein the determination may be performed taking into consideration the surroundings model and/or the two-dimensional projection.

In one embodiment, a/the two-dimensional projection may be calculated using an image section indicated by image data and/or camera data.

The surroundings model may indicate a representation of the vehicle and its surroundings. In the described embodiment, a two-dimensional projection may be calculated or determined using image data and/or camera data, for example as an image section of the camera data. It is advantageous to use a two-dimensional projection in the determination, since the amount of data to be processed is thus reduced in comparison with all of the data of the surroundings model.

In one embodiment, the two-dimensional projection may be formed by the/an image section of a rear view or front view with respect to the vehicle.

The two-dimensional projection may be calculated such that it shows the rear or the front of the vehicle together with the roadway. In one embodiment, the two-dimensional projection may at least partly indicate a roadway marking and the vehicle.

In the described embodiments, the two-dimensional projection is selected precisely such that the sections of the surroundings model that are advantageous for determining a lane change indication are recorded. Using a rear view or a front view thus makes it possible to depict the vehicle together with the roadway or the current lane. The amount of data to be processed is thus reduced, and rapid processing is ensured.

In one embodiment, the surroundings model may be formed by camera data, distance sensor data, a road model and/or map data, in particular by way of sensor fusion.

The surroundings model may comprise a multiplicity of different data, but in particular camera data that have been recorded by the cameras arranged on the vehicle. For this purpose, vehicles usually have cameras that capture the surroundings of the vehicle. These data may be combined by way of sensor fusion, such that it is possible to generate a three-dimensional representation of the surroundings. A camera in the context of this application may be understood to mean a camera with a CCD sensor, CMOS (also APS) sensor. Cameras may comprise visible light cameras or else infrared cameras.

The data may furthermore be enriched with sensor distance data. The distances from neighboring objects may thus also be represented accurately. Sensor distance data may be provided for example by ultrasound sensors, lidar or radar sensors that may be arranged in the outer skin of a vehicle.

It is ultimately also possible to use map data in order to enrich the surroundings model. Map data thus comprise the arrangement of buildings or road widths. It is thus possible to generate a highly accurate model of the surroundings of a vehicle. This is particularly important in particular with regard to autonomous driving. By using different sensor data that are delivered by a very wide variety of sensors, the accuracy of the surroundings model is increased. On the other hand, this means that the determination of the lane change indication is also able to be performed more accurately.

In one embodiment, the road model may comprise at least one indication about a road surface, a rolling resistance and/or a number of lanes of a roadway.

The road model may indicate the properties of a road. Of particular interest to the present invention is the number of lanes that a roadway has. The road model may thus store, at each geographical position, the number of lanes that are present there. Using a road model to determine a lane change indication that indicates a lane change further increases the accuracy of the lane change recognition.

In one embodiment, the position data may form an input for the lane change model, wherein the lane change indication may indicate whether the vehicle is performing, will perform and/or has performed a lane change.

In one embodiment, the lane change model may be implemented as a function that may make a binary decision, on the basis of the position data, as to whether the vehicle is performing a lane change, will perform a lane change and/or has performed a lane change. It is particularly advantageous to recognize not only merely a lane change that has been performed, but rather also the intention to perform a lane change. The response speed of the lane change model is thereby further increased.

In one embodiment, the method may comprise training a classifier, in particular a neural network, using a multiplicity of lane change indications.

It is thus also possible to use the lane change indications determined by the method to train a further classifier that is used in the vehicle during operation in order to recognize a lane change. This classifier may perform the determination of a lane change indication using data recorded by the vehicle. This thus dispenses with complex annotation of training data. This process may be performed fully automatically, as shown. It is thereby possible firstly to achieve a significantly higher speed when creating such a classifier, and costs are able to be reduced. The classifier may likewise be a neural network, preferably a convolutional neural network (CNN).

The object is furthermore achieved in particular by a non-transitory computer-readable storage medium that contains instructions that prompt at least one processor to implement a method as has been described above when the instructions are executed by the at least one processor.

This results in advantages similar or identical to those described with the above method.

The object is furthermore achieved by a vehicle, comprising:
- a non-transitory computer-readable storage medium, as described above;
- a vehicle computing apparatus that is designed to execute instructions stored on the storage medium.

It is thus possible for the method described above to be performed in a vehicle. Processing the data in a computing center or on a server is thereby dispensed with. Transmission of the data thereby becomes superfluous. In a further embodiment, the vehicle may comprise a vehicle communication apparatus for transmitting position data to a server, wherein the server performs the steps for determining a lane change indication. The training of a classifier may in particular be performed on the server.

The object is achieved in particular by a vehicle, in particular a self-driving vehicle, comprising at least one computing apparatus that is designed to control the vehicle at least partly using logic, in particular using a classifier, preferably a neural network, that is produced, in particular trained, using a multiplicity of lane change indications, wherein the multiplicity of lane change indications is determined according to one of the methods described above.

A vehicle may therefore use logic to determine the lane change behavior of other traffic participants during operation. Traffic safety is thus increased. The control of the vehicle also becomes safer and reliability is increased.

The invention is explained in more detail below with reference to figures.

BRIEF DESCRIPTION OF THE DRAWINGS

FIG. 1a shows a schematic illustration of a vehicle that is performing a lane change.

FIG. 1b shows a graph of distance data of the vehicle from FIG. 1a.

The same reference signs are used below for identical or functionally identical parts.

DETAILED DESCRIPTION OF THE DRAWINGS

Figures 1A, 1B:
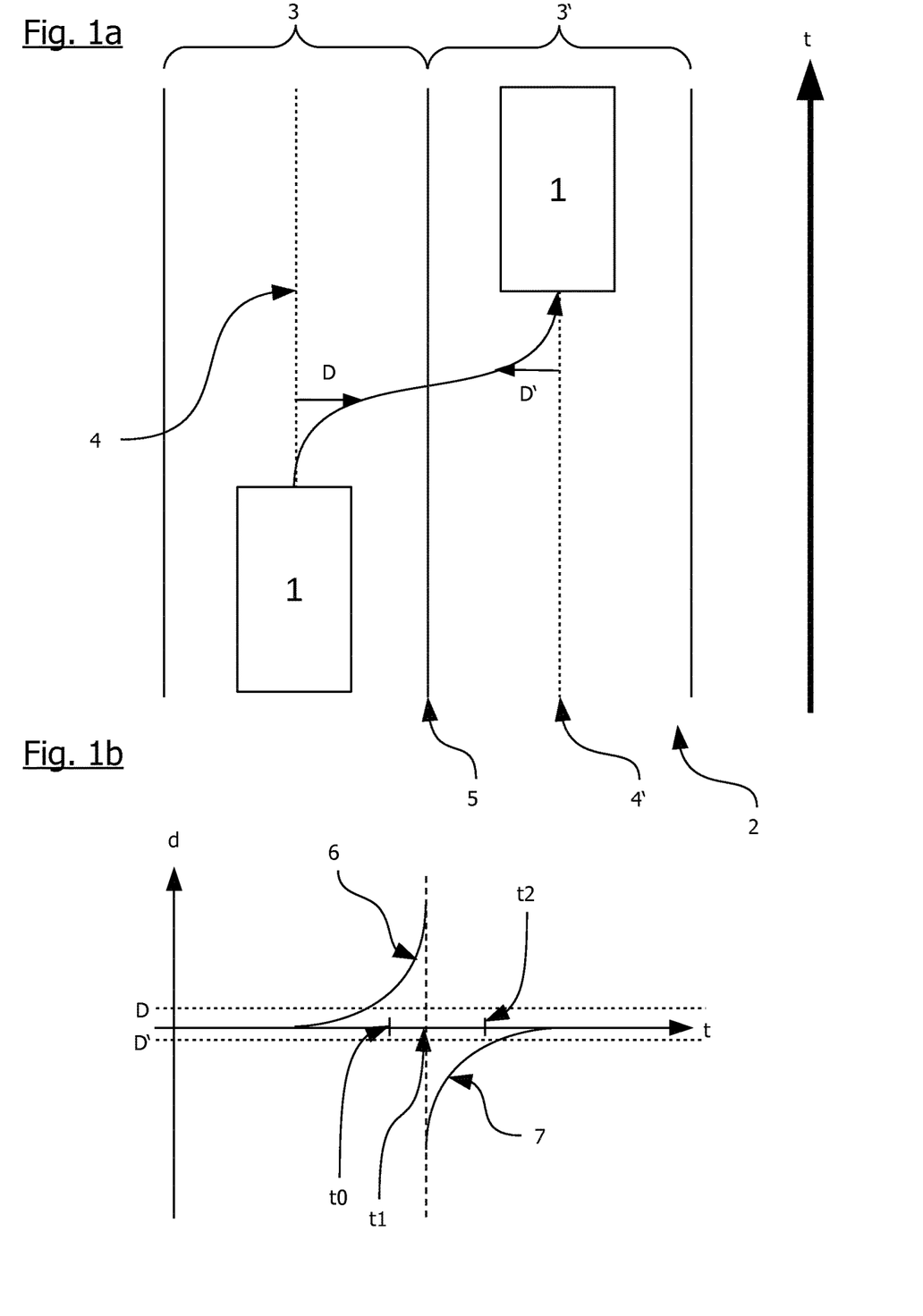

FIG. 1a shows a schematic illustration of a vehicle that is performing a lane change. In this case, FIG. 1a shows a roadway 2 that has two lanes 3, 3'. Roadway centers 4, 4' are illustrated in each case in the lanes 3, 3'. FIG. 1a shows, from the bottom upwards, the temporal profile of a lane change that is performed by the vehicle 1 shown in FIG. 1a. In the lower region of FIG. 1a, the vehicle 1 is located on the left-hand lane 3 of the roadway 2. The distance between the vehicle 1 and the lane center 3 at the start of the lane change is 0 meters. With regard to the vehicle 1, a vehicle reference point is defined in order to determine the distance D. In the exemplary embodiment that is shown, the geometric midpoint of the vehicle 1 is adopted as vehicle reference point.

In this case, in order to determine the distance between the vehicle reference point of the vehicle 1 and the lane center 3, the shortest link is measured, that is to say the length of the link that runs perpendicular from the lane center 4 to the vehicle reference point.

When a lane change is performed from the left-hand lane 3 to the right-hand lane 3', the distance D from the lane center 4 to the vehicle reference point becomes greater until the vehicle 1 crosses the roadway marking 5 arranged between the lanes 3, 3'. What is decisive is that the distance D from the lane center 4, 4' on which the vehicle 1 is currently located is measured. The information as to the lane 3, 3' on which the vehicle 1 is currently located may be determined by a surroundings model of the vehicle 1. If however only the surroundings model is taken into consideration, this may lead to errors.

At the time at which the vehicle 1 travels over the roadway marking 5, there is a change of sign in the distance D from the lane center 4, 4' of the current lane of the vehicle 1. In the exemplary embodiment in FIG. 1a that is shown, it is assumed that the distance D illustrated on the left-hand lane 3 is positive. The distance D' that the vehicle has in the right-hand lane 3' is assumed to be negative. This behavior is illustrated once again in FIG. 1b. In order to determine whether a lane change is present, when looking at the graph in FIG. 1b, it may thus be checked whether a change of sign takes place. It is furthermore possible to establish whether there is a prevailing point of discontinuity.

In the exemplary embodiment in FIG. 1b, the vehicle has a positive distance D from the lane center 4 of the left-hand lane 3 at the time t0. At the time t1, the vehicle 1 passes the roadway marking 5, such that the distance D' from the lane center 4' is negative. This is illustrated in FIG. 1b by the jump at the time t1.

In the case of using only the lane data from the surroundings model, when determining whether a lane change is present, there may be many resultant errors in terms of recognizing the lane change. This problem is illustrated in FIG. 2.

Figure 2:
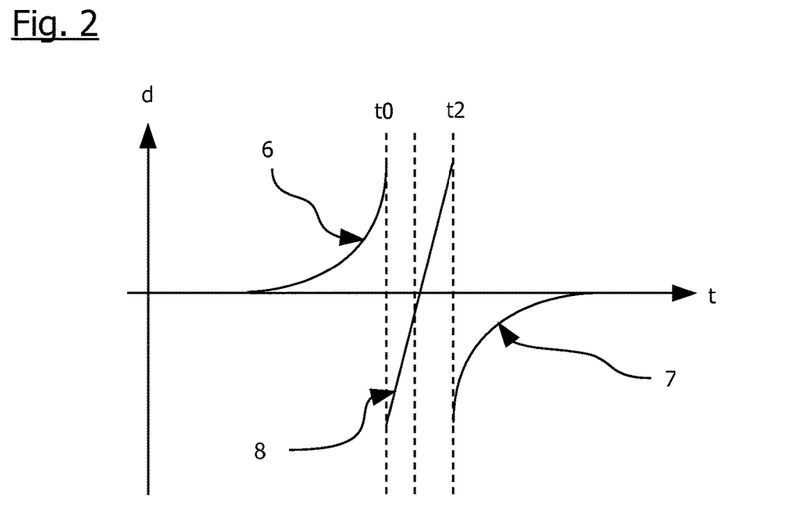
FIG. 2 shows a graph that has a point of discontinuity.

FIG. 2 shows a graph that corresponds to that of FIG. 1b. In this case, there is a jump of the distance curve 6 at the time t0. A simple method based only on a change of sign would detect a lane change at this point. As FIG. 2 shows, the jump at the point of discontinuity 8 is however impacted by a measurement inaccuracy and the distance curve again indicates a positive value for the distance D at the time t2. A rule-based system would thus detect a total of three lane changes, even though only one lane change has actually taken place. This problem is also referred to as oscillation.

The present invention recognizes only a single lane change in the variant shown in FIG. 2.

Figure 3:
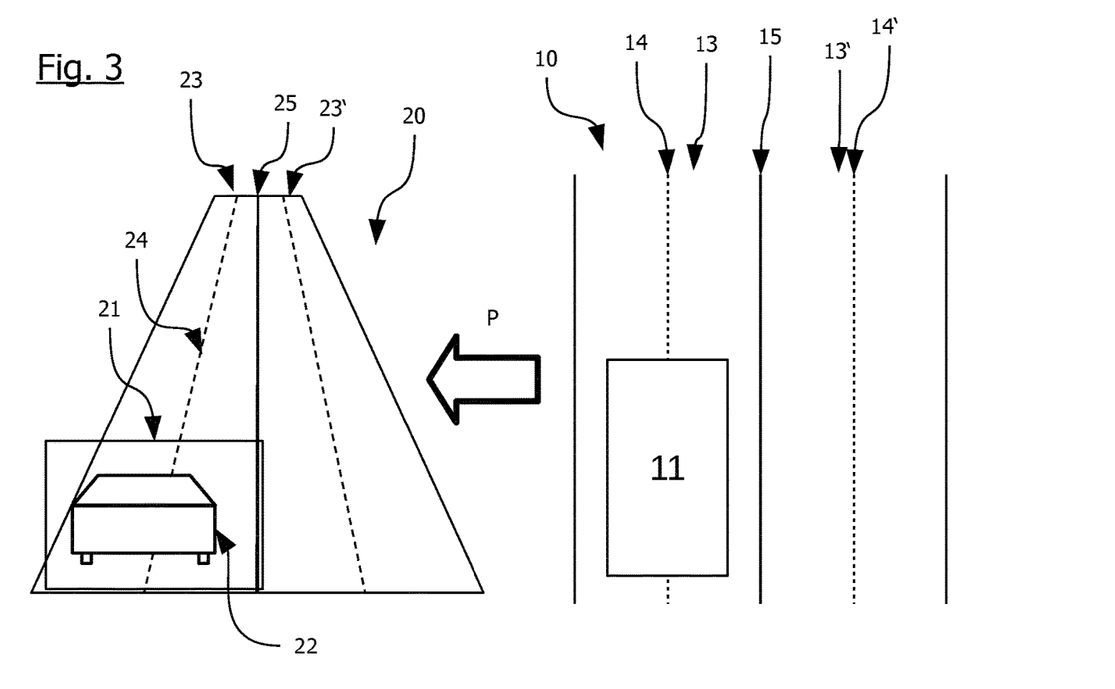
FIG. 3 shows a schematic illustration of the two-dimensional projection of a surroundings model.

FIG. 3 shows how the data from a surroundings model 10 may be able to be put to use together with image data in order to determine the lane change. The surroundings model 10, shown on the right-hand side in FIG. 3, comprises information with regard to a vehicle model 11 and a road. The surroundings model 10 in particular comprises information with regard to the vehicle model 11 and its geographical arrangement in lane models 13, 13'.

The image plane 20 shows image data. In the exemplary embodiment, a camera of the vehicle 1 generates image data that represent the road and vehicles traveling in front or following vehicles. The surroundings model 10 and the image data are thus available for determining a lane change. The image data may be reduced such that only an image section that shows the rear view of a vehicle traveling in front or the front view of a following vehicle is processed further. Using a classifier, for example an artificial neural network such as a CNN, the lane change is able to be recognized. Particularly good results are achieved when the data from the surroundings model 10 and the image data serve as input parameters for the classifier.

In the exemplary embodiment of FIG. 3, the sensor is arranged in the vehicle 1 such that the image plane 20 shows the vehicle 22 traveling in front and a section of the road. The image data furthermore show the roadway marking 25 and the lanes 23, 23'. The lane centers 24, 24' are furthermore also illustrated. An image section or a bounding box 21 that comprises the vehicle 22 and part of the lane 23 is then selected from the image plane 20 for further use.

The bounding box 21 furthermore comprises part of the roadway marking 25. It is thus possible to determine a distance between the vehicle or a vehicle reference point and the roadway marking, since it is assumed that the dimensions of the vehicle model 22 are known. It is furthermore possible to determine the side of a roadway marking on which the vehicle 22 is located.

Figure 4:
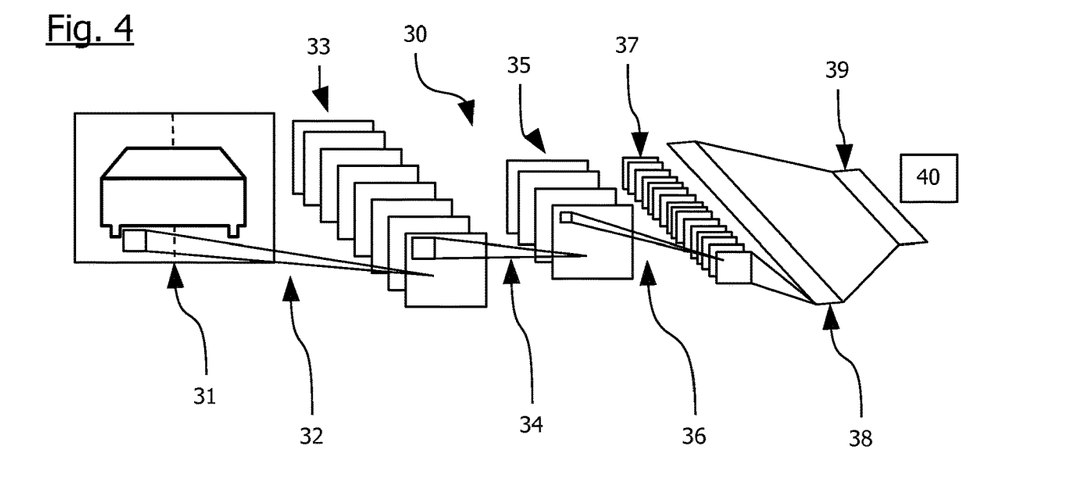
FIG. 4 shows a schematic illustration of the processing of a two-dimensional projection by a convolutional neural network (CNN).

FIG. 4 shows by way of example how the content of the bounding box, that is to say the image section of the image plane 20, may be processed by a convolutional neural network (CNN). The convolutional neural network 30 of FIG. 4 comprises five layers 33, 35, 37, 38, 39. The input image 31 corresponds to the bounding box 21 in FIG. 3. Since the model 30 is a convolutional neural network, a multiplicity of what are known as kernels is used in order to process the input image 31. Each kernel in particular scans over the pixels of the input image 31 in a sequential manner, for example from the top left to the bottom right. A parameter, what is known as the "stride", indicates the number of pixels by which each kernel should be displaced upon each movement.

The kernel size furthermore indicates the size of that part of the input image 31 that is intended to be processed. Depending on the size of the input image 31, the kernel size and the stride, the size of the first feature maps 33 is thus determined. Each feature map in this case corresponds to a feature detector. By way of example, a first feature map may be designed to recognize corners or edges. The first feature map could thus constitute a map of corners in the input image 31. A second feature map could indicate edges.

Arranged in the next layer of the convolutional neural network 30 are a second layer of second feature maps 35 that are generated by subsampling 34. In this layer, the first feature maps 33 are reduced to second feature maps 35. A more compact representation is thus produced. One advantage is that the size of the convolutional neural network 30 is thus reduced. Training is thereby simplified and the prediction speed is increased.

A set of third feature maps 37 is produced from the four second feature maps 35 through a convolution operation 36, as has already been described for the first feature map 33. The result of the third feature maps 37 is used as input of what is known as a feedforward neural network. This feedforward neural network is a fully connected network that comprises two layers 38 and 39.

The output layer 39 may be what is known as a softmax layer that makes it possible to divide each input image 31 into one of a plurality of classes. In the exemplary embodiment in FIG. 4, a lane change indication 40 that indicates whether a lane change is able to be recognized in the input image 31 is generated as output from the output layer 39. In one embodiment, there is thus provision for only two classes to be used.

Figure 5:
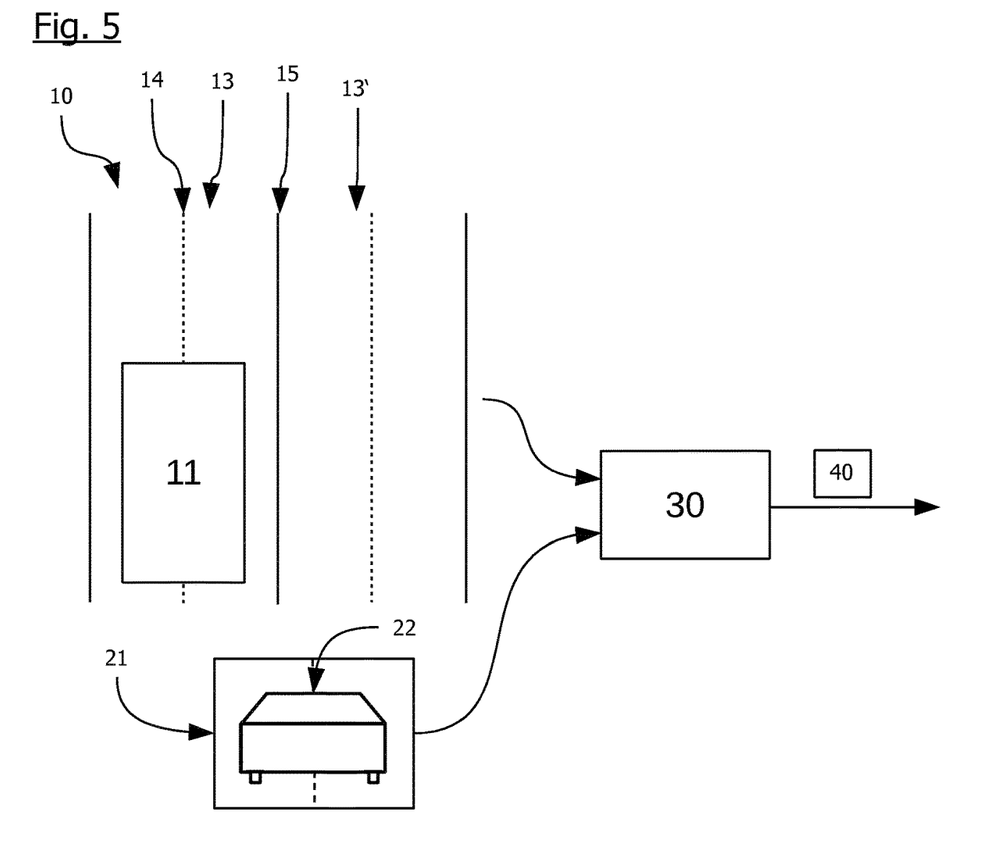
FIG. 5 shows a schematic illustration of the processing of a two-dimensional projection and of position data by an algorithm.

FIG. 5 shows a further exemplary embodiment of the invention. In the exemplary embodiment of FIG. 5, in addition to the input image 21 or 31, the surroundings model 10 is additionally used as input into the convolutional neural network. The surroundings model 10 may in this case in particular comprise a road model, such that additional information about the surface or a rolling resistance is able to be taken into consideration when determining a lane change indication 40. A lane index generated using the surroundings model 10 may furthermore also be taken into consideration.

A lane index may indicate the lane in which a vehicle 1 or a vehicle model 11 is located. In this case, in order to determine the lane index, only information that is indicated directly by the surroundings model 10 is however used. Further vehicle data, such as speed, transverse acceleration or forward acceleration, may furthermore be taken into consideration.

FIG. 5 accordingly shows an exemplary embodiment that may use a large amount of information in order thus to determine an accurate lane change indication 40. The lane change indication 40 is determined by a convolutional neural network, as has been described in detail with regard to FIG. 4.

Figure 6:
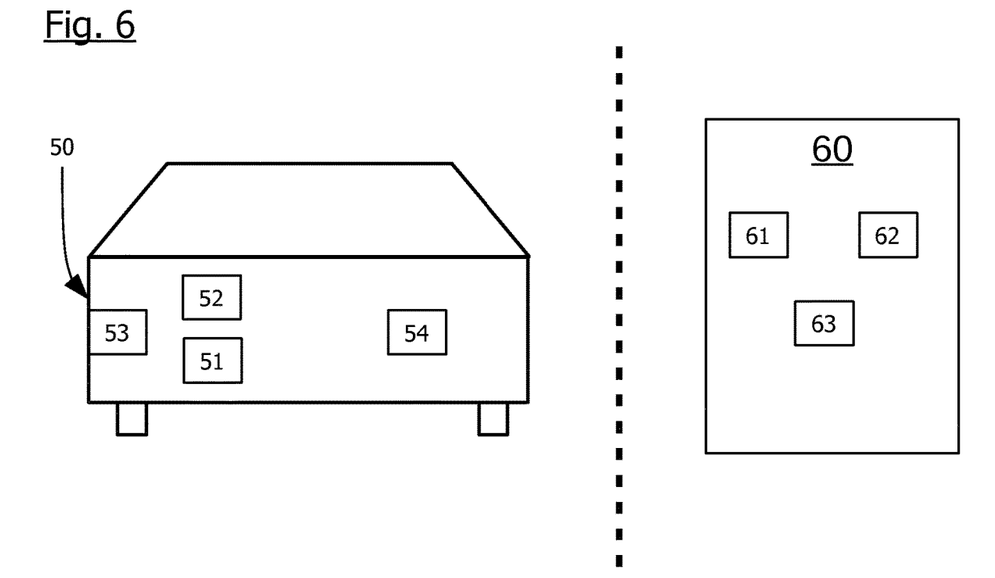
FIG. 6 shows a schematic illustration of a vehicle and of a server.

FIG. 6 shows a further exemplary embodiment in which a vehicle 50 is connected in terms of communication to a server 60 or a server communication apparatus 61 via a vehicle communication apparatus 54. The vehicle 50, in addition to the vehicle communication apparatus 54, comprises a perception system 53, for example a stereo camera system or other cameras. A storage apparatus 52 and a classification apparatus 51 are furthermore provided. The vehicle 50 may be used as a test vehicle that collects data and transmits them to the server 60 in one exemplary embodiment. This means that the classification or the annotation of the data provided by the vehicle 50 is performed on the server 60 by the illustrated server computing apparatus 62. The annotated data may be stored on the server 60 in the server storage apparatus 62. Using the annotated data, the server 60 is able to train a classifier that is designed to determine a lane change indication on the basis of camera data and/or a surroundings model.

The classifier trained by the server may be executed by the classification apparatus 51 of the vehicle 50. The vehicle 50 is thus henceforth capable of reliably recognizing a lane change at any time. The vehicle 50 may in this case use recorded sensor data, for example image data, to perform a classification.

In one exemplary embodiment, the server 60 may be a computing center or a cluster. A multiplicity of different components may thus be used in order to implement the function of the server that is shown. The server 60 may in particular be designed to receive data from a multiplicity of different vehicles and to train a classifier as described above using the data from the multiplicity of vehicles.

It is pointed out at this juncture that any of the embodiments and exemplary embodiments described above may be combined with another exemplary embodiment or embodiment as desired.

LIST OF REFERENCE SIGNS 1 vehicle
2 roadway
3, 3' lane
4, 4' lane center
5 roadway marking
6, 7 distance curves 8 point of discontinuity
10 surroundings model
11 vehicle model
13, 13' lane model
14 lane center model
15 roadway marking model
20 image plane
21 bounding box
22 vehicle
23, 23' lane
24 lane center
25 roadway marking
30 convolutional neural network (CNN)
31 input image
32 first convolution
33 first feature maps
34 subsampling
35 second feature maps
36 second convolution
37 third feature maps
38 fully connected layer
39 output layer
40 lane change indication
50 vehicle
51 classification apparatus
52 storage apparatus
53 perception system
54 vehicle communication apparatus
60 server
61 server communication apparatus
62 server storage apparatus
63 server computing apparatus
D, D' distance from the roadway center
t0, t1, t2 time
t time axis
d distance axis
P projection

What is claimed is:

1. A method for determining a lane change indication of a vehicle, comprising:
loading a lane change model and position data of the vehicle, wherein
the position data indicate a distance between the vehicle and a lane center of a lane of a roadway on which the vehicle is currently located, and
the lane change model is configured as a convolutional neural network; and
determining a lane change indication, wherein
the determination is performed using the position data and the lane change model, and
the determination comprises detecting a point of discontinuity in the distance between the vehicle and the lane center of the lane of the roadway.

2. The method according to claim 1, wherein
the position data comprise at least two data points, and
each data point indicates the distance between a vehicle reference point of the vehicle and a lane center of a roadway at a particular time.

3. The method according to claim 1, wherein
the point of discontinuity is a change of sign.

4. The method according to claim 1, further comprising:
calculating a two-dimensional projection using a surroundings model, wherein the determination is also performed taking into consideration the surroundings model and/or the two-dimensional projection.

5. The method according to claim 4, wherein
the two-dimensional projection is formed by an image section of a rear view or front view with respect to the vehicle.

6. The method according to claim 5, wherein
the two-dimensional projection at least partly indicates a roadway marking and the vehicle.

7. The method according to claim 4, wherein
the two-dimensional projection at least partly indicates a roadway marking and the vehicle.

8. The method according to claim 5, wherein
the surroundings model is formed by camera data, distance sensor data, a road model and/or map data, by way of sensor fusion.

9. The method according to claim 4, wherein
the surroundings model is formed by camera data, distance sensor data, a road model and/or map data, by way of sensor fusion.

10. The method according to claim 9, wherein
the road model comprises at least one indication about a road surface, a rolling resistance and/or a number of lanes of a roadway.

11. The method according to claim 1, wherein
the position data form an input for the lane change model, and
the lane change indication indicates whether the vehicle is performing, will perform, or has performed a lane change.

12. The method according to claim 1, further comprising:
training a classifier using a multiplicity of lane change indications.

13. The method according to claim 12, wherein
the classifier is a neural network.

14. A computer product comprising a non-transitory computer-readable storage medium having stored thereon program code that, when executed by a processor, carries out the acts of:
loading a lane change model and position data of a vehicle, wherein
the position data indicate a distance between the vehicle and a lane center of a lane of a roadway on which the vehicle is currently located;
determining a lane change indication, wherein
the determination is performed using the position data and the lane change model; and
training a classifier using a multiplicity of lane change indications, wherein
the multiplicity of lane change indications comprises:
detecting a point of discontinuity in the distance between the vehicle and the lane center of the lane of the roadway; and
calculating a two-dimensional projection using a surroundings model, wherein the surroundings model comprises one or more of:
camera data;
distance sensor data;
a road model; and/or
map data.

15. A vehicle, comprising:
a computer-product according to claim 14; and
a vehicle computing apparatus having the processor configured to execute the program code stored on the storage medium.

16. A vehicle, comprising:
a computing apparatus that is designed to control the vehicle at least partly using a neural network, that is trained with a multiplicity of lane change indications, wherein
the multiplicity of lane change indications is determined by:
loading a lane change model and position data of the vehicle, wherein
the position data indicate a distance between the vehicle and a lane center of a lane of a roadway on which the vehicle is currently located;
determining a lane change indication by detecting a point of discontinuity in the distance between the vehicle and the lane center of the lane of the roadway; and
calculating a two-dimensional projection using a surroundings model, wherein
the determination is also performed taking into consideration the surroundings model and/or the two-dimensional projection, and
the two-dimensional projection at least partly indicates a roadway marking and indicates the vehicle.

17. The vehicle according to claim 16, wherein the vehicle is a self-driving vehicle.

* * * * *